(12) United States Patent
Lee

(10) Patent No.: US 8,479,601 B2
(45) Date of Patent: Jul. 9, 2013

(54) GEARLESS TRANSMISSION MECHANISM

(75) Inventor: Henry Yu-Heng Lee, Chicago, IL (US)

(73) Assignee: General Electric Company, Schenectady, NY (US)

( * ) Notice: Subject to any disclaimer, the term of this patent is extended or adjusted under 35 U.S.C. 154(b) by 487 days.

(21) Appl. No.: 12/849,040

(22) Filed: Aug. 3, 2010

(65) Prior Publication Data
US 2012/0031216 A1    Feb. 9, 2012

(51) Int. Cl.
*F16H 21/18*    (2006.01)

(52) U.S. Cl.
USPC .................................................. 74/47; 74/49

(58) Field of Classification Search
USPC ........................ 74/469, 25, 43, 47, 49, 63, 89
See application file for complete search history.

(56) References Cited

U.S. PATENT DOCUMENTS

| | | | | |
|---|---|---|---|---|
| 2,869,139 | A | * | 1/1959 | Mosher ............................ 623/57 |
| 3,094,816 | A | * | 6/1963 | Dreier ............................ 451/213 |
| 3,474,570 | A | | 10/1969 | Vogt et al. |
| 6,338,567 | B1 | | 1/2002 | Denley |
| 7,311,632 | B2 | | 12/2007 | Dissett et al. |
| 2004/0045390 | A1 | * | 3/2004 | Salesse et al. ................... 74/469 |
| 2009/0158674 | A1 | * | 6/2009 | Guerrero et al. ............... 52/81.2 |

FOREIGN PATENT DOCUMENTS

WO    8201093 A1    4/1982

* cited by examiner

*Primary Examiner* — Justin Krause
(74) *Attorney, Agent, or Firm* — GE Global Patent Operation; Catherine J. Toppin

(57) ABSTRACT

A gearless transmission mechanism includes a plurality of identical linkages, each having an off-center center of rotation, an input end and an output end. The linkages being connected to each other such that the input end of one linkage is connected to the output end of another linkage. When force is applied to the input end of one linkage an output force results in the output end of the other linkage, which is not connected thereby resulting in force reduction.

20 Claims, 4 Drawing Sheets

FORCE INPUT = 2 lb
CENTER DISTANCE = 2 in

| | 1ST ORDER | 2ND ORDER | 3RD ORDER | 4TH ORDER | 5TH ORDER | 6TH ORDER |
|---|---|---|---|---|---|---|
| FORCE OUTPUT | 1 | 8 | 16 | 32 | 64 | 128 |

FIG. 7

GEARLESS TRANSMISSION MECHANISM

BACKGROUND

1. Technical Field

The invention includes embodiments that relate to a gearless transmission mechanism and a universal force transformer. The invention can be used with mechanical systems involving manual or automatic levers, where the angle of rotation is limited. The invention can also be installed with solenoid systems to manipulate the travel and force output of the solenoid.

2. Discussion of Art

Currently, when a significant force reduction system is needed in a small space a gear transmission system is used, such as in a transfer switch. With conventional transmission systems, the geometry of the transfer switch is restricted to the size requirement of the transmission design. Gear transmission systems that are currently available are large and have long lead times. In addition, many of the significant force reduction systems available today are not cost effective. In attempts to alleviate long lead times, systems having long linkage have been used to gain greater mechanical advantages, however, systems having this type of design occupy a large amount of space.

There is a need for a force reduction system that can flexibly manipulate input or output forces and rotational or linear movements while being compact and cost effective.

Therefore, it may be desirable to have a system with properties and characteristics that differ from those properties of currently available systems.

BRIEF DESCRIPTION

In one embodiment, the present invention includes a first linkage, having a first off-centered center of rotation, an input end and an opposing output end, a second linkage having a second off-centered center of rotation, an input end and an opposing output end, the input end of the second linkage being connected to the output end of the first linkage, a third linkage having an input end and an output end, the third linkage mounted to the first off-centered center of rotation, the input end of the third linkage connected to the output end of the second linkage, a fourth linkage having an input end and an output end, the fourth linkage mounted to the second off-centered center of rotation, the input end of the fourth linkage connected to the output end of the third linkage, a fifth linkage having an input end and an output end, the fifth linkage mounted to the first off-centered center of rotation, the input end of the fifth linkage connected to the output end of the fourth linkage, and a sixth linkage having an input end and an output end, the sixth linkage mounted to the second off-centered center of rotation, the input end of the sixth linkage connected to the output end of the fifth linkage, wherein force applied to the input end of said first linkage generates an output force from the output end of the sixth linkage.

In one embodiment, a gearless transmission system includes a first and second linkage, each having an off-center center of rotation, an input end and an opposing output end, the input end of the first linkage is connected to the output end of the second linkage, wherein a force is applied to the input end of the first linkage thereby generating force from the output end of the second linkage.

DESCRIPTION OF THE FIGURES

The drawings illustrate embodiments contemplated for carrying out the invention. Like reference numbers represent the same, or similar, parts where used.

FIG. 7 is a chart representing ratios of force in accordance with the present invention.

DETAILED DESCRIPTION

The invention includes embodiments that relate to a gearless transmission mechanism. A gearless transmission mechanism includes a plurality of identical linkages, each having an off-center center of rotation, an input end and an output end. The linkages being connected to each other such that the input end of one linkage is connected to the output end of another linkage. When force is applied to the input end of one linkage an output force results in the output end of the other linkage, which is not connected thereby resulting in force reduction. The force output and input ratio can be adjusted with a different quantity of linkages and a different center-to-center distance.

Figure 1:
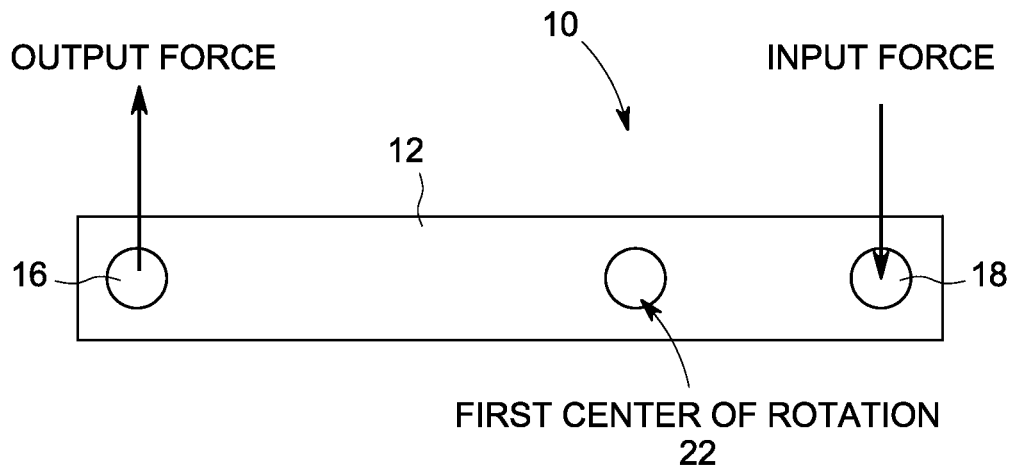
FIG. 1 is a schematic representation of a single linkage of a gearless transmission system according to the present invention.

This invention could also be used for a manual spring charging mechanism, where users are required to pull a lever up and down to charge a spring to store its potential energy. As stated previously, this invention allows for a more cost-effective and smaller design, compare to the conventional methods. In addition, users are able to adjust the input and output ratio simply by adjusting the center-to-center distance, without having to re-design or change parts. With reference to FIG. 1, according to one embodiment of the present invention a system 10 includes a first linkage 12. First linkage 12 has an off-centered center of rotation 14, an output end 16 and an input end 18. Off-centered center of rotation 14 is mounted on a first center of rotation 22.

As seen in the figures, all of the linkages are identical. They each include an off-centered center of rotation, an output end and an input end. As the linkage is connected to one another, they are alternatively mounted on a first center of rotation and a second center of rotation. This is accomplished by inverting alternating linkages.

Figure 2:
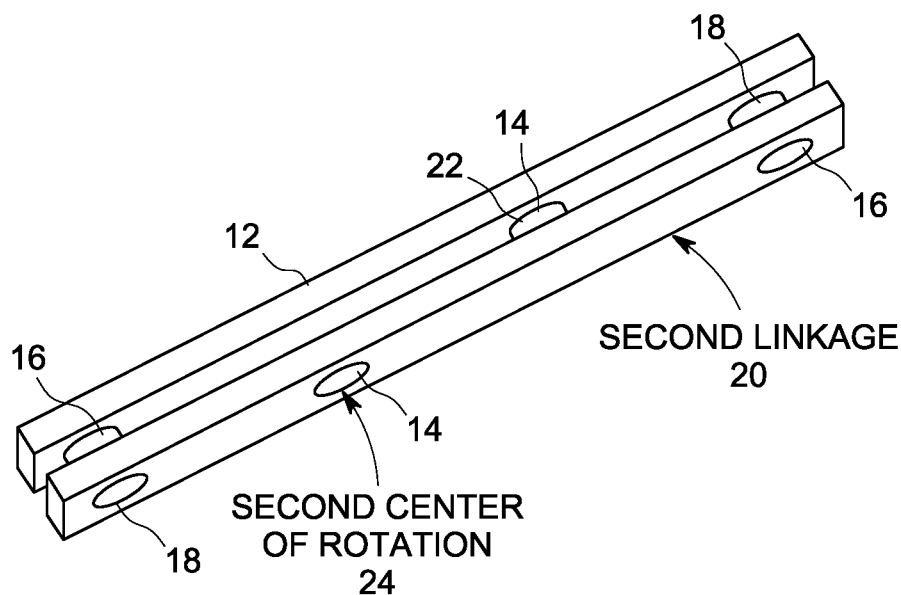
FIG. 2 is a schematic representation of two linkages of a gearless transmission system according to the present invention.
Figure 3:
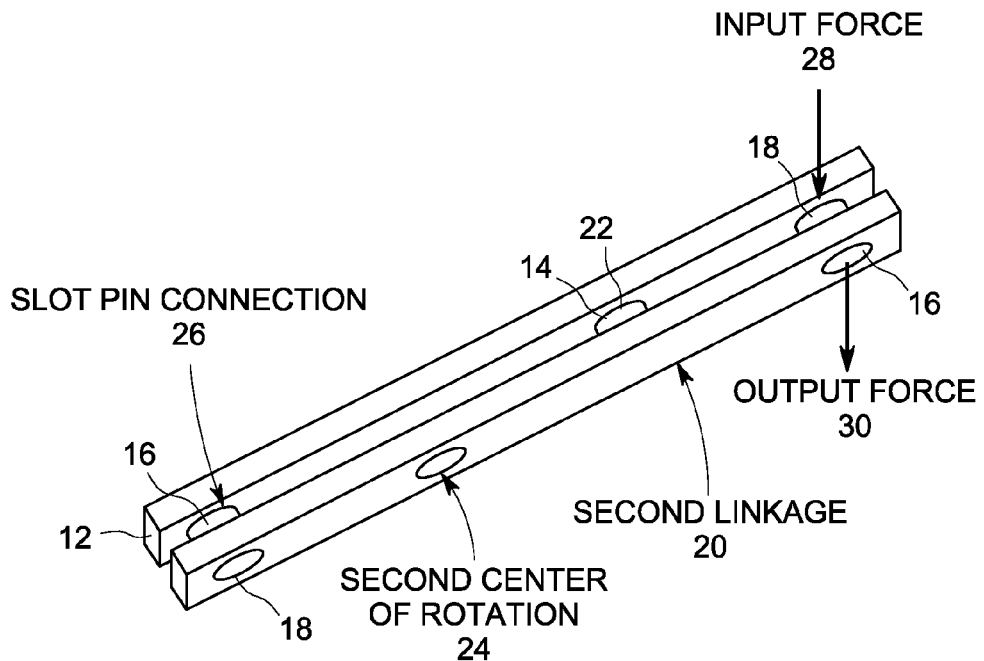
FIG. 3 is schematic representation of two linkages of a gearless transmission system according to the present invention.
Figure 4:
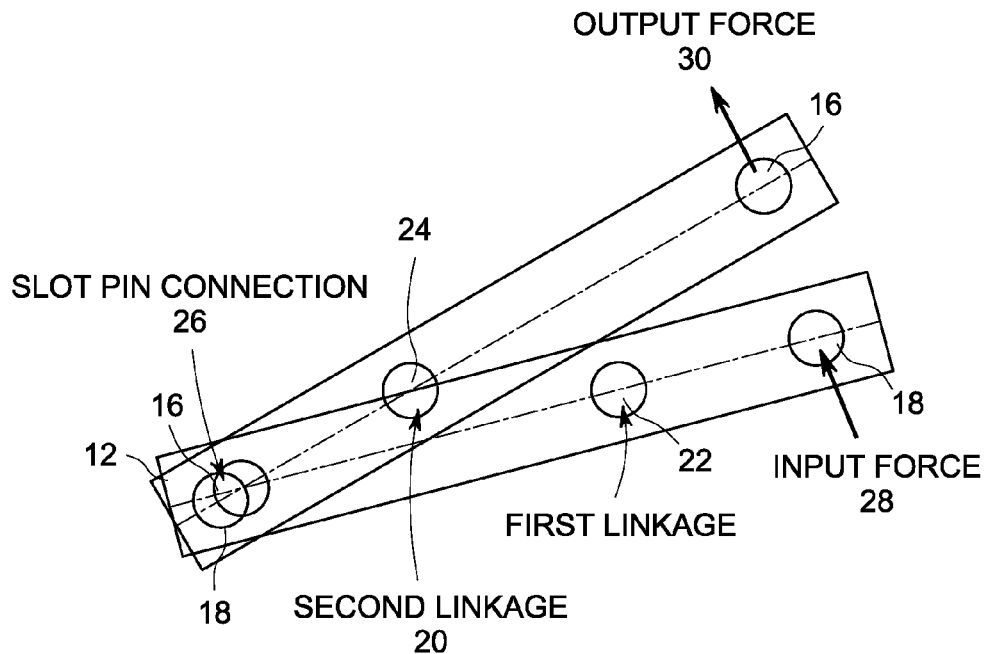
FIG. 4 is a schematic representation of two linkages of a gearless transmission system according to the present invention.

FIGS. 2, 3 and 4 show a second linkage 20 added to first linkage 12 according to an embodiment of the present invention. Second linkage 20, has an off-centered center of rotation 14, and input end 18 and an output end 16. Off-centered center of rotation 14 of second linkage 20 is mounted to a second center of rotation 24. The input end 18 of second linkage 20 is connected to the output end 16 of first linkage 12 by slot-pin 26. In FIG. 4, it is shown how output end 16 of second linkage 20 is not connected to any linkage. As an input force 28 is applied to input end 18 of first linkage 12, an output force 30 results at output end 16 of the first linkage. Output force 30 acts as an input force being applied to input force end 18 of the second linkage, which, in turn, produces an output force at output force end 16 of the second linkage. In one embodiment, input force 28 is applied perpendicularly to the linkage. As first linkage 12 is rotated upward, or counter-clockwise, second linkage 20 is forced to travel a greater distance. This manipulates the input force into a greater or smaller force (depending on the dimensions) from output end 16 of second linkage 20.

Figure 5:
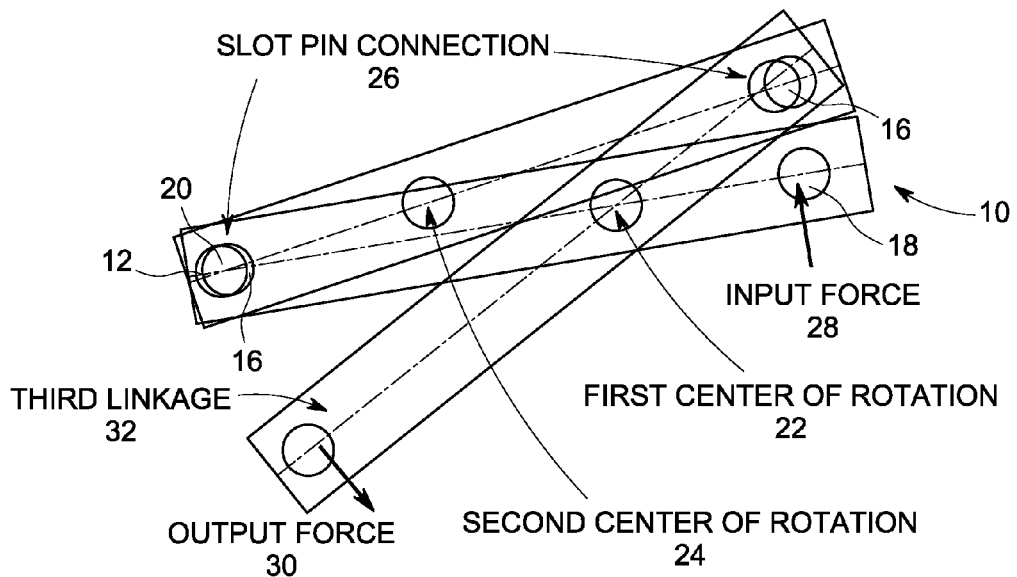
FIG. 5 is a schematic representation of three linkages of a gearless transmission system according to the present invention.

Turning now to FIG. 5, a third linkage 32 is added to system 10. Third linkage 32 is identical to first linkage 12 and second linkage 20, having an off-centered center of rotation 14, an output end 16 and an input end 18. Third linkage 32 is mounted on first center of rotation 22 the same as first linkage 12. The input end 16 of third linkage 32 is connected to the output end 16 of second linkage 20 by a slot pin 26, thereby leaving output end 16 of third linkage 32 not connected to anything. As discussed above, when input force 28 is applied to input end 18 of first linkage 12, an output force 30 is created at output end 16 of the first linkage. The force at output end 16 acts as the input force for second linkage 20, which then creates an output force at output end 16 of the second linkage. The output force created at output end 16 of the second linkage acts as the input force at input end 18 of the third linkage, thereby resulting in a greater or smaller output force 30 at output end 16 of the third linkage. In the illustrated configuration, force is reduced and travel distance is increased. However, it is contemplated that the input and output locations can be reversed. If the input and output locations are reversed, the force is magnified as the travel distance is reduced.

Figure 6:
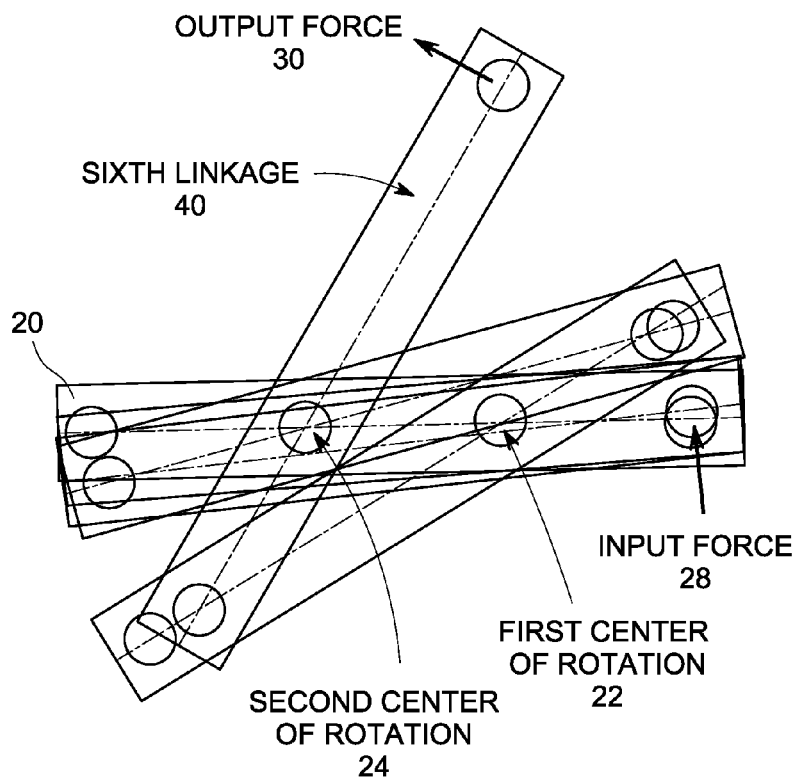
FIG. 6 is a schematic representation of six linkages of a gearless transmission system according to the present invention.

The design of the present invention gives the user the ability to manipulate the input and output forces. Additional identical linkages can be added as needed to increase or decrease the amount of force desired For example, transfer switches at different ratings require different input and output ratios due to their distinctive geometries. With this invention, users can simply add or remove the same linkages or adjust the center-to-center distance to manipulate the input and output forces and travel distance, opposed to having different mechanical designs with conventional methods. This benefit in commonality allows for additional cost reductions because identical parts are being used in larger quantities across different products. FIG. 6 shows one embodiment of the present invention in which six linkages are used. As discussed above, all six linkages have an off-centered center of rotation 14, an output end 16 and an input end 18. The linkages are situated such that the first, third and fifth linkages are mounted on the first center of rotation 22, and the second, fourth, and sixth linkages are mounted on the second center of rotation 24. The linkages are connected to one another with slot pins 26. The input end 18 of each linkage is connected to the output end 16 of the preceding linkage. In the embodiment shown in FIG. 6, the only ends that remain free are input end 18 of the first linkage and the output end 16 of the sixth linkage 40. An input force 28 can be applied to the input end 18 of the first linkage, and because of the relationship between all the linkages, an output force 30 will result from output end 16 of the sixth linkage 40 that is reduced. Motions can be translated from linear to rotational, or vise versa.

FIG. 7 shows a chart of the relationship of the exponential growth of force reduction increment when using a system having a 2-pound force input and a 2-inch center distance. The force output can be manipulated to the desired output by changing the dimensions of the system.

There are many advantages of this invention. The present invention discloses a force reduction system that can change a reduction ratio without changing parts. Also, the system disclosed herein can be universally applied to any applications that require force reduction. In addition, the system can be manufactured quickly and at a lesser cost than other force reduction systems available. The flexibility of the design allows for the overall volume of the system to be smaller than other systems. Moreover, compare to having distinct designs for each product lines with conventional methods, this invention introduces the commonality advantage. The commonality advantage of the present invention allows for a cost reduction not only in each particular product, but also across all product lines that utilize the invention, due to the increase of overall usage of identical parts.

The design of the present invention allows for flexible translations between input/output forces, and rotational/linear movements. The design allows for significant reduction/increment in forces/movements in a small space.

The embodiments described herein are examples of systems and methods having elements corresponding to the elements of the invention recited in the claims. This written description may enable those of ordinary skill in the art to make and use embodiments having alternative elements that likewise correspond to the elements of the invention recited in the claims. The scope of the invention thus includes articles, systems and methods that do not differ from the literal language of the clauses, and further includes other articles, systems and methods with insubstantial differences from the literal language of the claims. While only certain features and embodiments have been illustrated and described herein, many modifications and changes may occur to one of ordinary skill in the relevant art. The appended claims cover all such modifications and changes.

The invention claimed is:

1. A gearless transmission system comprising:
   a first linkage, having a first off-centered center of rotation, an input end and an opposing output end;
   a second linkage having a second off-centered center of rotation, an input end and an opposing output end, said input end of said second linkage being connected to said output end of said first linkage;
   a third linkage having an input end and an output end, said third linkage mounted to said first off-centered center of rotation, said input end of said third linkage connected to said output end of said second linkage;
   a fourth linkage having an input end and an output end, said fourth linkage mounted to said second off-centered center of rotation, said input end of said fourth linkage connected to said output end of said third linkage;
   a fifth linkage having an input end and an output end, said fifth linkage mounted to said first off-centered center of rotation, said input end of said fifth linkage connected to said output end of said fourth linkage; and
   a sixth linkage having an input end and an output end, said sixth linkage mounted to said second off-centered center of rotation, said input end of said sixth linkage connected to said output end of said fifth linkage, wherein force applied to said input end of said first linkage generates an output force from the output end of the sixth linkage.

2. The gearless transmission system of claim 1, wherein said linkages are connected via slot pins.

3. The gearless transmission system of claim 1, wherein linkages can be added or removed to increase or decrease force reduction.

4. The gearless transmission system of claim 1, wherein rotating said first linkage results in magnification or reduction of force and travel by said second, third, fourth, fifth and sixth linkages.

5. The gearless transmission system of claim 1, wherein all of said linkages are identical.

6. The gearless transmission system of claim 1, wherein said output force generated at said output end of said sixth linkage can be manipulated by the distance said first linkage is rotated.

7. The gearless transmission system of claim 1, wherein said output force is manipulated by increasing or decreasing the distance between the center of rotations of the linkages.

8. The gearless transmission system of claim 1, further comprising a transfer switch.

9. A gearless transmission system comprising:
a first and second linkage, each having an off-centered center of rotation located along each linkage, an input end and an opposing output end;
said off-centered center of rotation of said second linkage is mounted to a second center of rotation;
the input end of said second linkage is connected to the output end of said first linkage,
wherein the gearless transmission system is configured to receive a force applied to said input end of said first linkage thereby generating a second force from said output end of said second linkage; and
wherein the first and second linkages are straight links.

10. The gearless transmission system of claim 9, wherein said force is applied perpendicular to said input end.

11. The gearless transmission system of claim 9, wherein identical linkages can be added to or removed from said system.

12. The gearless transmission system of claim 9, wherein said first and second linkages are identical.

13. The system of claim 9, wherein the force from said input end is manipulated into a greater or smaller second force from said output end.

14. The system of claim 9, wherein said input and output locations are reversed, thereby magnifying force as travel distance is reduced.

15. The system of claim 9, wherein rotating said first linkage results in a greater distance traveled by said second linkage.

16. The gearless transmission system of claim 9, further comprising a transfer switch.

17. The gearless transmission system of claim 9, further comprising adjustable center-to-center distances among the linkages.

18. A gearless mechanical lever comprising:
a first linkage, having a first off-centered center of rotation located along the first linkage, and having an input end and an opposing output end;
a second linkage, having a second off-centered center of rotation located along the second linkage, and having an input end and an opposing output end, wherein the input end of the second linkage is connected to the output end of the first linkage;
intermediate linkages that are alternatively mounted on the first off-centered center of rotation or the second off-centered center of rotation; and
a last linkage having an input end and an output end, the last linkage mounted to one of the first or second off-centered centers of rotation, and the input end of the last linkage connected to the output end of a last intermediate linkage, wherein the linkages are straight links.

19. The gearless mechanical lever of claim 18, wherein the gearless mechanical lever is part of a transfer switch.

20. The gearless mechanical lever of claim 18, further comprising adjustable center-to-center distances among the linkages.

* * * * *